(12) United States Patent  (10) Patent No.: US 8,786,847 B2
Lewin et al.  (45) Date of Patent: Jul. 22, 2014

(54) LIGHT MEASURING METER APPARATUS

(75) Inventors: Ian Lewin, Scottsdale, AZ (US); John O'Farrell, Cave Creek, AZ (US)

(73) Assignee: Underwriters Laboratories, Inc., Northbrook, IL (US)

( * ) Notice: Subject to any disclaimer, the term of this patent is extended or adjusted under 35 U.S.C. 154(b) by 246 days.

(21) Appl. No.: 13/004,913

(22) Filed: Jan. 12, 2011

(65) Prior Publication Data

US 2012/0176610 A1 Jul. 12, 2012

(51) Int. Cl.
*G01J 1/42* (2006.01)
*G01J 1/02* (2006.01)
G02B 7/32 (2006.01)
G01C 3/08 (2006.01)

(52) U.S. Cl.
CPC ... *G01J 1/02* (2013.01); *G02B 7/32* (2013.01); *G01C 3/085* (2013.01)
USPC ......... 356/219; 356/614; 356/3.01; 356/4.01; 396/104

(58) Field of Classification Search
CPC .......... G01J 1/02; G01J 1/029; G01J 1/4228; G01J 1/4209; G02B 7/32; G01C 3/085
USPC ............... 356/213–223, 614–623, 4.01, 4.07, 356/3.01, 3.15, 4.1; 396/104, 123
See application file for complete search history.

(56) References Cited

U.S. PATENT DOCUMENTS

| | | | |
|---|---|---|---|
| 2,929,295 A | 3/1960 | Vos | |
| 3,087,370 A | 4/1963 | Rogers | |
| 3,582,666 A | 6/1971 | Geiger | |
| 3,634,694 A | 1/1972 | Hardesty | |
| 3,843,267 A | 10/1974 | Vital | |
| 3,843,835 A | 10/1974 | Mosca et al. | |
| 4,737,029 A | 4/1988 | Yabusaki | |
| 5,185,637 A | 2/1993 | Lewin | |
| 5,323,226 A | 6/1994 | Schreder | |
| 5,442,716 A | 8/1995 | Otsu | |
| 6,088,085 A | 7/2000 | Wetteborn | |
| 7,656,509 B2 * | 2/2010 | Haddock et al. | 356/4.07 |
| 2003/0103769 A1 | 6/2003 | Ohkado | |
| 2004/0105091 A1 | 6/2004 | Zaidi et al. | |
| 2005/0110976 A1 | 5/2005 | LaBelle | |
| 2006/0066957 A1 * | 3/2006 | Fukui | 359/689 |
| 2009/0177426 A1 * | 7/2009 | Dodds et al. | 702/85 |
| 2009/0190119 A1 * | 7/2009 | Lewin et al. | 356/4.01 |

FOREIGN PATENT DOCUMENTS

GB 2372314 10/2000

* cited by examiner

*Primary Examiner* — Hoa Pham
(74) *Attorney, Agent, or Firm* — Douglas W. Rudy

(57) ABSTRACT

This invention is related to a light measuring apparatus and a method of using the device. It is used to measure various photometric quantities of the light emanating from a distant source of light.

8 Claims, 8 Drawing Sheets

LIGHT MEASURING METER APPARATUS

BACKGROUND OF THE INVENTION

1. Field of the Invention

This invention is related to a light measuring apparatus and a method of using the device. It is used to measure various photometric quantities of the light emanating from a distant source of light. In this device the field of selected light is more accurately measured than in other devices known to the inventors.

Generally a source of light, particularly an exterior source of light, is configured and positioned to cast light in a desired pattern. Often the source of light will indiscriminately emit light such that the some of the emitted light is directed beyond the zone to be illuminated. Light extending beyond the intended zone of the lighting system is "spillover." When spillover extends beyond property lines it is known as "trespass light" and may be objectionable for various reasons to people subjected to intrusive trespass light.

The device presented in this disclosure measures the light emitted from a distant source of light. The distant source of light may be the source of spillover light, trespass light and a source of glare. The measurement of spillover and trespass light is the target of the light measuring apparatus presented herein. The measurement of the trespass light will be used to determine the acceptability of the source of light configuration, that is, whether or not the trespass light or glare is acceptable or unacceptable to a viewer in a particular situation.

A telescopic light-sensing meter used to measure received levels of distant sources of light is disclosed. The light-sensing device is connected to, in one embodiment, an onboard processing unit that will process information related to light measurements being performed by the meter. The processor will also receive information from an integrated distance-measuring device. Data from the distance measuring device and the light measurements collected in the apparatus are processed and a finite number representing a measurement of light intensity emitted by a source of light is displayed to the equipment user.

One aspect of this invention is that the light measurement path through the light meter is also the path taken by reflected laser pulses emanating from the distance measuring device of the light measuring apparatus and reflected back from a target source of light. Thus a single light path through the light measuring apparatus is used for the distance-measuring device and for light measurement.

2. Description of the State of the Art

Outdoor light measuring meters are available to measure illuminance values in lux or footcandles. These state of the art light meters measure only the illuminance of the area on which the light falls. These are simple portable meters with a light sensitive cell that is positioned on the surface of interest and generates a signal to an appropriate display, which then indicates the illuminance level of the surface being measured. This type of meter is effective in measuring illuminance on vertical surfaces, such as a vertical window of a residence. The meter may also be used to measure illuminance on a horizontal surface, such as on a floor of a building. This type of light measuring meter and the above method does not meet today's need of measuring spillover or trespass lighting that needs to be measured in terms of light intensity.

Other light measuring meters referred to as telephotometers, are available. Telephotometers may use a lens to focus the image of a source of light of interest onto a light sensitive cell. Frequently the focusing optics is similar to those used in a telescope and can be used to view light from a distant source. The quantity of light measured by a telephotometer is the luminance of the area at which the telephotometer is aimed, luminance being the intensity of light per unit area of the source of light area being measured. Luminance measurements are usually stated as footlamberts or candelas per square meter.

Other terms pertinent to light measuring devices are terms such as "luminous intensity" and "illuminance." Luminous intensity is a photometric quantity measured in lumens per steradian ("lm/sr"), or candelas ("cd"). "Illuminance" is the total luminous flux incident per unit area on a surface. Illuminance is a measure of the density of the incident light on a surface.

It is now realized that there is a need to measure light intensity emitted by a source of light "in the field" rather then simply in a laboratory setting as is commonly done. There are few apparatus or methods of measuring light intensity in the field. Thus the inventors herein have undertaken the development of a compact, portable light-measuring meter that can measure light intensity in the field.

In many situations a homeowner or a municipal body may have a complaint of spillover lighting. Government regulations frequently limit the light intensity that can be emitted as light intensity correlates closely with the offending visual effects. Unfortunately, up to now, there was no way to measure the spillover or trespass light without placing a meter directly on an affected surface to measure illuminance on the surface. However placement of a light meter close to and proximate a surface is sometimes impractical or impossible. It would be very desirable if there were equipment available to measure the intensity emitted by a source of light of a particular source of light and not just illuminance on a surface lit by the source of light. The apparatus presented fulfills the goal of field measurement of light intensity by providing a compact, portable, light weight light measuring meter that can measure the intensity of light emitted from a distant source of light.

It has also been found that it is more useful to measure intensity of a source of light at a point distant from the source of light, rather than to measure the total illuminance of light falling on a surface.

SUMMARY OF THE INVENTION

There is an increasing awareness in communities and public service companies of the need to conveniently measure the intensity of sources of light. It is desirable and important to be able to make light intensity measurements in the field. Light intensity is usually measured in laboratory settings and translation of such measurement to real life situations in the field environment is not as accurate or usable as is desired. With consistent field measurement of the intensity of light at a particular location distant from the source of light, the regulation of unwanted light from outdoor lighting fixtures can be fairly and uniformly addressed. If light energy or light rays emitted by light fixtures illuminate areas outside of that area which they are intended to light, the light is considered to be "spillover light," or "trespass light." Spillover light, in residential neighborhoods, disturbs the tranquility of the night sky resulting in diminished quality of life and in some cases, may be detrimental to the health and well being of humans.

Spillover light is also unnecessarily wasteful and may be esthetically displeasing and environmentally undesirable. Moreover, such light will often be perceived by persons in nearby areas as disability glare, discomfort glare, or nuisance or annoyance glare, which are all objectionable and may be dangerous or cause discomfort.

Environmental lighting zones have been proposed where the amount of spillover light and glare will be limited by regulations and codes. The limits may be of various and different types. For example, the intensity of light output from a source of light, measured as lumens per steradian or in candelas, may have a specified limit; any source of light fixture having intensities emitted by a source of light and directed beyond the intended area to be lit that are higher than the emitted light intensity limitation set forth in a regulation may not be permitted by a local or national code. The apparatus set forth herein allows for the field measurement of the intensity of light emitted by a source of light in a particular direction and thus would be helpful in administration of such regulations and codes.

Light output also may be regulated based on the level of illuminance, measured in footcandles or lux, at the eye of a person viewing the source from a particular location. The term "eye illuminance" is used in the industry to specify the lighting level at a person's eye received from an individual luminaire or group of luminaires, and is measured on a plane perpendicular to the line of sight when the person is looking at the source of light.

Another method of specifying an allowable light level in a regulation is in terms of the luminance or photometric brightness of a source of light. This source of light may be from the lighting fixture itself or the source of light can be the light reflected from a surface.

For light trespass and glare regulations to be practical and effective there must be a method of measuring the specified light quantity. This will allow a determination to be made as to whether or not a particular luminaire or lighting installation meets the applicable code.

For light trespass measurements there is a pressing need for a convenient, portable, lightweight light meter device that will allow the measurement of the aforementioned various lighting quantities. Such measurements require that both the illuminance at the point of interest and the distance from the point of interest to the source of light be known.

The design of the device presented here is one where a field of a source of light is uniformly measured by the ability of the device to select an area around a source of light and have the selected area measured by the device. The selected area may contain either a single source of light or multiple sources of light to be measured. By processing the light entering the device and distance measuring device related laser pulses through a single optical path a more accurate and useful light measurement is possible. The splitter element of this design allows the light being measured to follow a single optical path.

In addition to measuring light intensity a multifunction light meter, such as the light meter disclosed herein, should, to be most useful, also be capable of measuring the other aforementioned lighting quantities. These include, but are not limited to, luminance and eye illuminance that are related to spillover light, light trespass and various types of glare.

The use of the apparatus disclosed herein along with solving various algorithms and appropriate formulas on board the light-measuring device, is used to calculate light intensity in the field.

Regulations that limit the level of light emission for the control of light trespass frequently specify the allowable light from a single luminaire. Therefore it is desirable that the metering device and measurement system be able to measure the light from one luminaire only, even though multiple luminaires may be present and ganged together acting as a single significant source of light. A luminaire to be measured in the field may be located at a considerable distance from the meter, and the angle the luminaire subtends to the meter will be small. In other situations, the luminaire may be fairly close to the meter, and its subtended angle may be large. It is thus desirable that the meter's angle of acceptance or field of view, that is, the angular range over which the meter accepts light, be variable in order to accommodate source of light fixtures of different sizes and at different distances from the light meter.

When using a conventional telephotometer, or a telescopic spot meter, to measure light from distant sources that have a narrow field of view, it can be difficult for the operator to find the source of light when sighting through the telephotometer. It is therefore desirable for the telephotometer to have a variable field of view. The operator will initially set the adjustable iris valve of the light-measuring device to a wide viewing angle thus allowing a source of light of interest to be easily identified and targeted. The operator than adjusts the adjustable iris valve to a narrow field of view.

Certain types of light trespass measurements may require simultaneously measuring the light from several luminaires, for example, a group of luminaires on a single pole. The field of view of the presented light meter is able to be widened to accomplish this. This is yet a further reason for the utility of a light meter that is variable in terms of its angular range of acceptance.

Advantages of the invention include the advantage of increased transportability in the field and a lower cost when compared to other solutions for measuring light in the field. The increased transportability is partly due to the weight savings realized by integration of the function of a distance measuring device into a single, lightweight, portable device.

One advantage of this device is that it allows floating point measurement of the target source of light rather than requiring the rounding off of measured values.

Another advantage of this device is that it allows autoranging.

A more general object of this invention is to provide a light-measuring meter that can measure light intensity of a distant source of light.

It is another object of this invention to provide a device that will calculate light intensity using a single portable device and display the light intensity measurement on the device.

It is a still further object of the light measuring meter to provide the ability to measure light intensity or eye illuminance from a single lighting fixture only, which may vary from one fixture to another in its angularly subtended size, or from a group of lighting fixtures in proximity to each other.

A still further object is to provide an instrument with an initial wide field of view for locating a source of light of interest, then, after the source of light is located, reducing the field of view to be more narrow than the initial wide field so to exclude extraneous sources of light.

It is also an object of the invention to provide a light meter that can measure light intensity, eye illuminance and luminance in an integrated portable device.

The preferred embodiments of the invention presented here are described below in the drawings and detailed specification. Unless specifically noted, it is intended that the words and phrases in the specification and the claims be given the plain, ordinary and accustomed meaning to those of ordinary skill in the applicable arts. If any other special meaning is intended for any word or phrase, the specification will clearly state and define the special meaning. Likewise, if a noun, term or phrase is intended to be further characterized or specified, such will include adjectives, descriptive terms or other modifiers in accordance with the normal precepts of English grammar. Absent use of such adjectives, descriptive terms or modifiers, it is the intent the nouns, terms or phrases be given their plain and ordinary English meaning to those skilled in the applicable arts.

Further, the use of the words "function," "means" or "step" in this specification is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for," and will also clearly recite a function, without also reciting in such phrases any structure, material or act in support of the function. Thus, even when the claims recite a "means for" or "step for" performing a defined function, if the claims also recite any structure, material or acts in support of that means or step, or that perform the function, then the intention is not to invoke the provisions of 35 U.S.C. 112, Paragraph 6. Moreover, even if the provisions of 35 U.S.C. 112, Paragraph 6 are invoked to define the claimed inventions, it is intended that the inventions not be limited only to the specific structure, material or acts that are described in the preferred embodiments, but in addition, include any and all structures, materials or acts that perform the claimed function as described in alternative embodiments, or that are well known present or later-developed, equivalent structures, material or acts for performing the claimed function.

BRIEF DESCRIPTIONS OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION OF THE INVENTION

Figure 1:
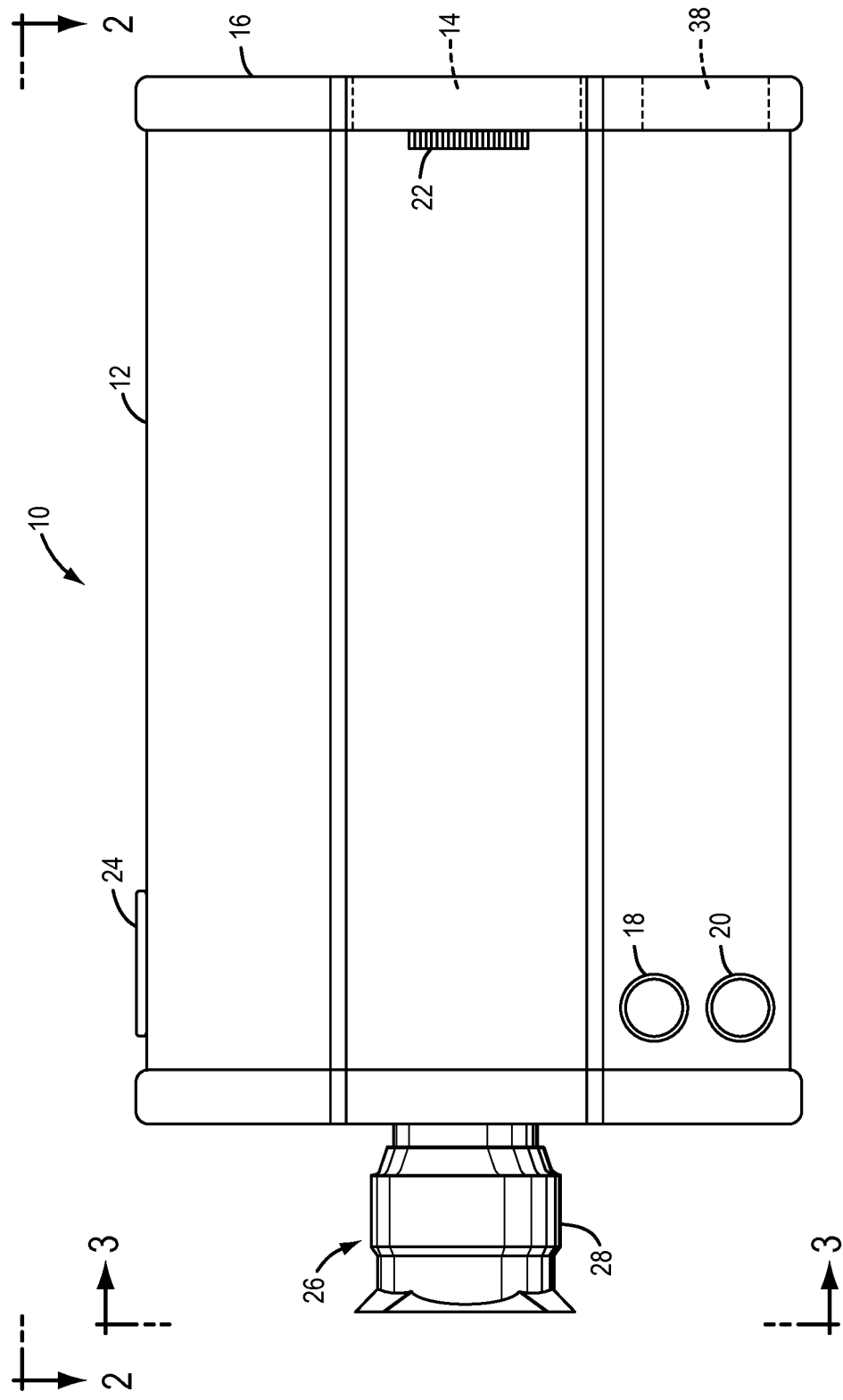
FIG. 1 is a top view of a light meter having an integrated design including a single path for light to be measured by the device.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In one embodiment of the invention presented herein the light-measuring meter is used as a luminance-measuring device. A selector switch on the device is set to the luminance measuring setting and the device is aimed at a source of light such as a luminaire or a plurality of luminaires in close proximity such that the field of view is entirely filled by the lighted luminaire or luminaires. With proper calibration, the light-measuring meter then provides a reading of the average luminance of the area being measured, in candelas per square meter. For the luminance calibration to be valid, the aperture that controls the angular size of the field of view must be constant during calibration and measurement. The iris valve diaphragm diameter control used in one embodiment of the invention can be marked with a setting to be used for luminance measurements, or, alternatively, the iris diaphragm can be adjusted by an operator and set at a certain diameter by conventional means such as a click-stop mechanism acting on the adjustment setting wheel of the iris valve diaphragm.

The light measuring apparatus comprises a meter having a lens system including an objective lens mounted at one end of a longitudinal body and a photo detector having a data output communication conduit. The photo detector is integral with the meter and receives light energy entering the light meter device through the single light path of the meter. There is also a light-metering valve, in one embodiment the valve is an iris valve, located in the body of the light meter device, generally at the focal plane of the object lens, between the location of the object lens and the location of the photo detector. In an alternative embodiment, the light-metering valve is a continuously adjustable light-metering valve.

Another component of the device is a controller, which includes a digital processor in communication with, among other items, the photo detector through the provided communications conduit.

Another element of the device is a distance-measuring device having electronic communication capability in communication with the controller. This distance-measuring device, which may be a laser distance-measuring device, is longitudinally aligned in the light path of the light-measuring meter. The distance measuring device and the light measuring meter are integral and longitudinally aligned such that light pulses sent from a light measuring meter and reflected back to the same light measuring meter are processed through the same light path as light being measured by the light measuring meter.

Figure 2:
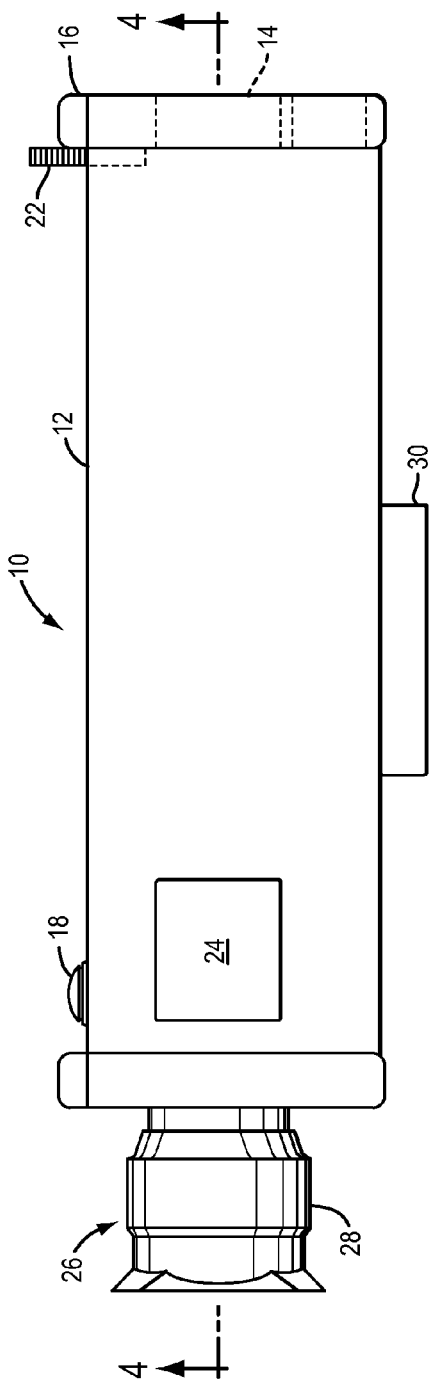
FIG. 2 is a side elevation view through plane 2-2 of the light meter of FIG. 1.
Figure 3:
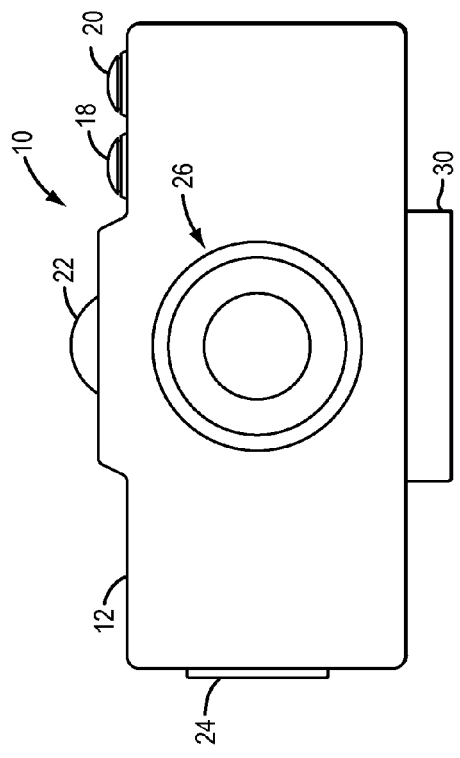
FIG. 3 is an end view of the light meter of FIG. 1 through plane 3-3.

Turning first to FIGS. 1-3, the housing of the light meter can be seen. In these figures the light measuring meter generally 10 includes a housing 12 that provides a strong, light and dirt impervious enclosure for housing the internal elements of the light meter. The housing supports an objective lens 14 at a first end 16 of the light measuring meter 10. In this embodiment the housing 12 is a generally rectangular body having a thickness about one-third of the length of the housing. The width of the housing is generally about two-thirds of the length of the housing however the width, length, and thickness of the housing can be selected to best accommodate the functional components of the device.

In FIG. 1 a first control button 18 is used to activate the laser distance-measuring device. In operation this button may also serve as the activation switch for the light-measuring meter. A second control button 20 is used to initiate light measurement. Both of these button operated switches are electrically connected to a control module 52 shown in FIG. 4.

An adjustment wheel 22 is provided to allow adjustment of the iris valve that is located in the light path of the device. The iris valve is mechanically connected, in one embodiment, by a long rod extending from the adjustment wheel to the iris valve body to allow manual adjustment of the iris valve as will be discussed further on.

On one side of the body 12 there is a screen 24. The screen is an optional alternative for showing data related to the measurement function. This screen may be a liquid crystal display screen or any similar type of screen that can be used to display data received at the screen from the control module of the device. An eyepiece, generally 26, having an adjustment enabling ring 28, allows a user to focus the view through the light-measuring meter to personal preference. A battery compartment 30 is positioned on the bottom surface of the body 12 for convenience but may be positioned in any one of numerous locations on or in the body of the light meter. It is also expected that a tripod mounting location is positioned on the bottom of the housing and this tripod mounting location could be integrated into the battery housing cover if desired. Alternatively other locations for a tripod mounting are possible on the bottom, sides, end or even the top of the housing as determined by designer's preference.

Figure 4:
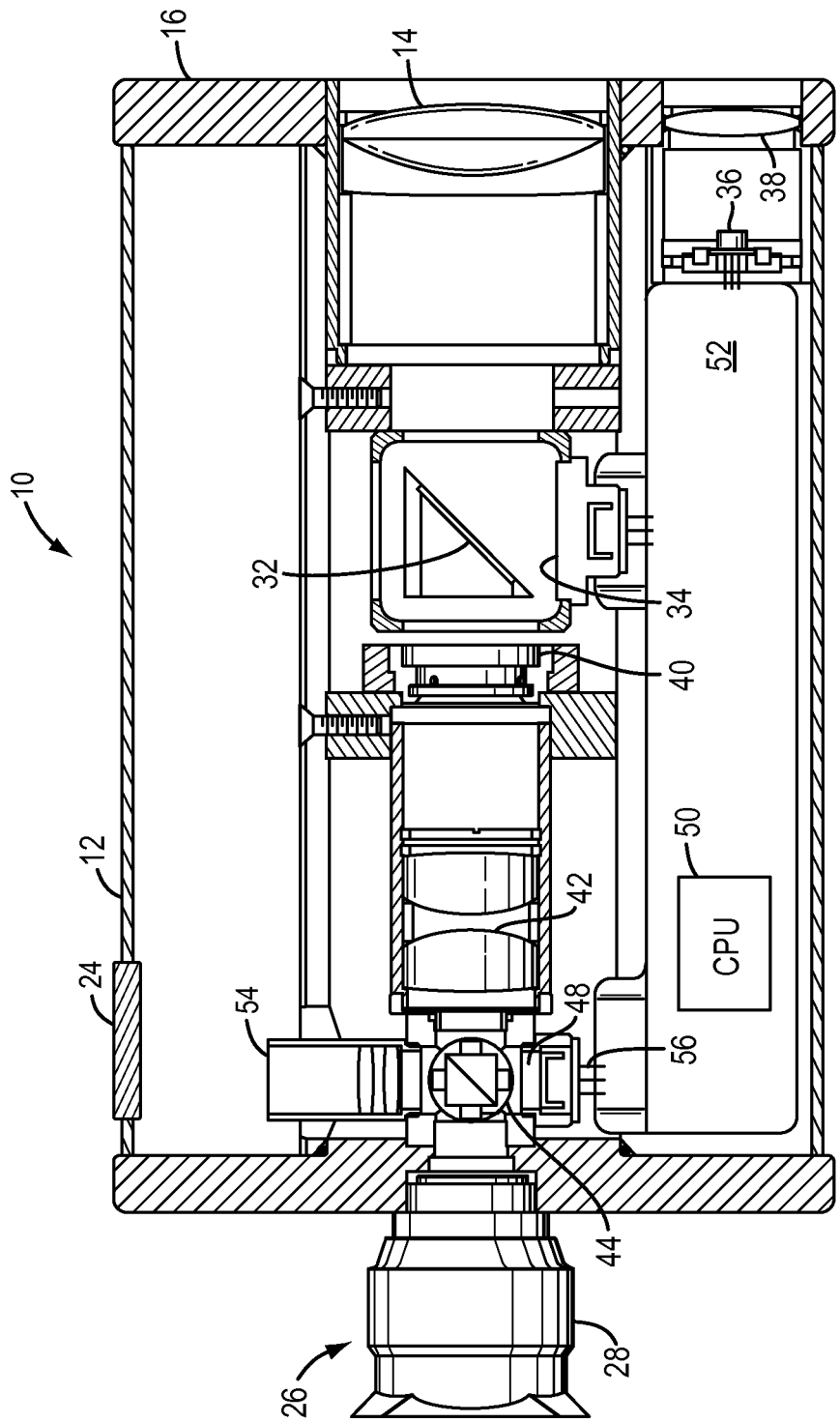
FIG. 4 is a cross sectional view of the light meter of FIG. 1 through plane 4-4 of FIG. 2.

FIG. 4 is a cross section of the light measurement meter through plane 4-4 of FIG. 2. This figure shows the light measurement meter having an integrated design including a single light path for light being measured and the same light path for distance measuring.

Light entering the light meter 10 through the objective lens 14 is directed to a pick off filter 32, also known as a "hot mirror," where an infrared component of the light beam is directed by the pick off filter 32 to an infrared detector 34. The light path through this section of the light meter will also, in addition to functioning as a light meter, function as a distance measuring device. In one embodiment of a distance-measuring device a laser diode 36 projects a series of pulsed light signals from the first end 16 of the light meter generally 10 to a distant target selected and acquired by the device operator. The pulsed beam of light emitted from the laser diode 36 is directed through lens 38 at the first end 16 of the light meter. The lens 38 in front of the laser diode 36 is located generally adjacent the light objective lens 14. The infrared detector 34 will receive pulses of light reflected from the distant target, the light pulses being reflected ones of those sent from the laser diode 36 of the light meter 10. An algorithm for comparing the travel time of pulses sent from the light meter to travel time differences over a measured period of time is used to determine distance to a target object in a well-known manner. The light-measuring meter is aimed at the luminaire or luminaires of interest and the distance measuring device element of the light-measuring meter will measure the distance to those source of light targets.

Light from a distant source of light that is being measured enters the light-measuring meter through the light objective lens 14 and passes through the pick off filter 32 through an iris valve 40. The iris valve 40 is located and mounted at the focal surface or proximate the focal plane of the light-measuring meter as determined by the focal length of the objective lens. Ideally, but not absolutely necessary, the plane of the diaphragm of the iris valve would be mounted on the focal plane.

The diaphragm aperture of the iris valve is controlled through an iris valve adjustment wheel (not shown in the cutaway presentation of FIG. 4) extending through the top of the housing 12 body. It can be either proximate the internal iris valve or at the end of the housing as shown in FIG. 1 as item 22. The iris valve adjustment wheel 22 can be rotated by an operator to select and limit the field of the target source of light being measured. That is to say, the iris valve is "closed down" to provide a small aperture and constrain the field of view in the vicinity of the source of light being measured. If the field of the target source of light is rather broad, the aperture of the iris valve 40 is "opened up" by an operator moving the iris valve adjustment wheel 22 allowing a broader field of view.

After passing through the iris valve 40 the light is directed through a relay lens set 42. The relay lens system will cast an image of, for instance, a target luminaire, the luminaire being the source of light of interest being measured, onto a conveniently placed focusing eyepiece 26. The eyepiece 26 allows the operator to view the source of light being measured and thereby assists in sighting in and aligning the meter on the target for proper aiming of the light-measuring meter.

Light from the relay lens set 42 is also directed to a splitter 44. The splitter 44 will divide the light beam into two paths. One path allows a portion of the light beam to pass into the adjustable focus lens in the area 28 of the eyepiece 26.

A second path of light from the splitter 44 is directed to a photo detector 48 that is energized by the light sensed and quantified by the photo detector 48. In one embodiment the size of the light sensitive area of the photo detector 48 is equivalent to the size of the area seen in the eyepiece 26 so that the operator can see the area of the target source of light being measured. The electrical charge sensed by the photo detector 48 will be sent to a control unit or central processor 50 carried on a printed circuit board 52 and electrically connected to all the electrical and electronic input and output elements of the device housed in the device.

The central processor 50 will include a computer or other programmable device. Through suitable electronic circuitry, programming and calibration of the control unit, a display appearing in the screen 24, or on an liquid crystal display 54 viewable through the eyepiece 26. Both the external screen 24 and the internal display 54 can indicate at least one of three operator-selected options showing measured quantity of light intensity, luminance, and/or eye illuminance.

Certain types of light trespass measurements may require simultaneously measuring the light from several luminaires, for example, a group of luminaires on a single pole of an athletic field or in a parking lot. The field of view of the light measuring meter should be able to be widened to accomplish acquiring the group of luminaires.

Figure 5:
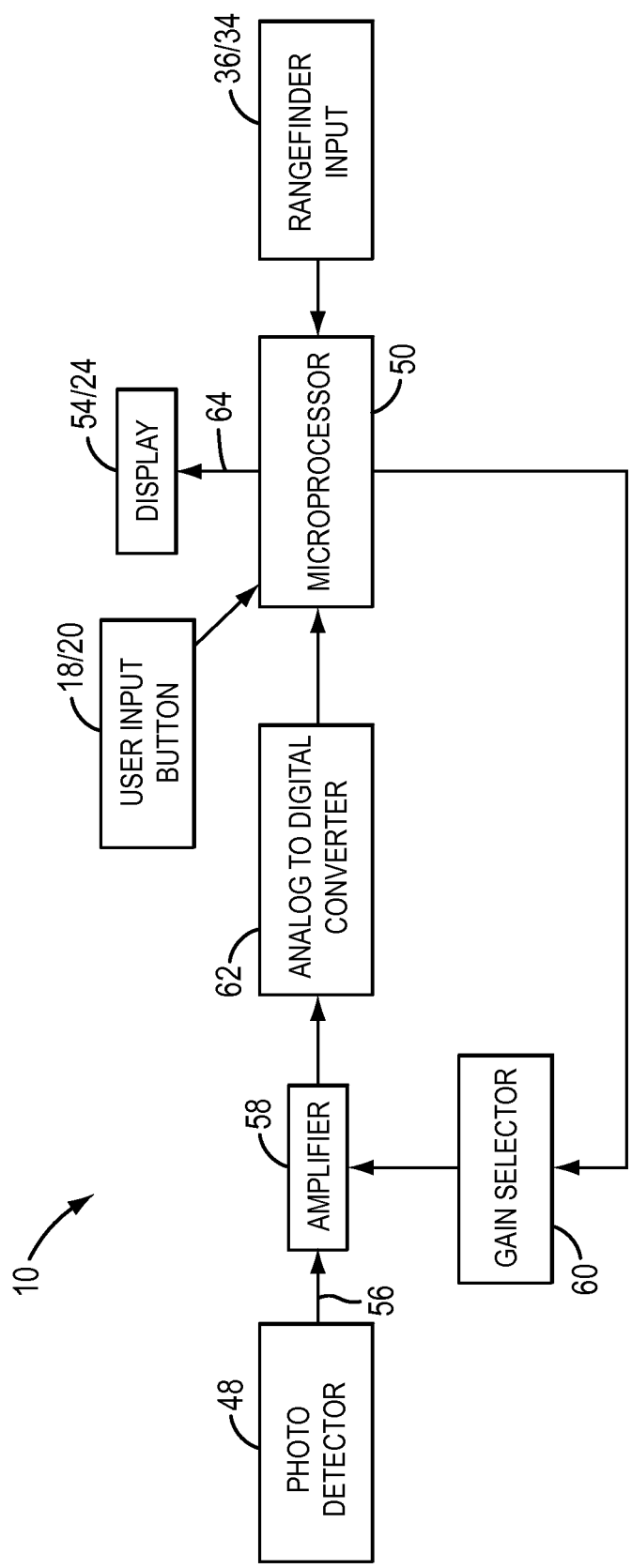
FIG. 5 is a block diagram of the system of the light meter.
Figure 6A:
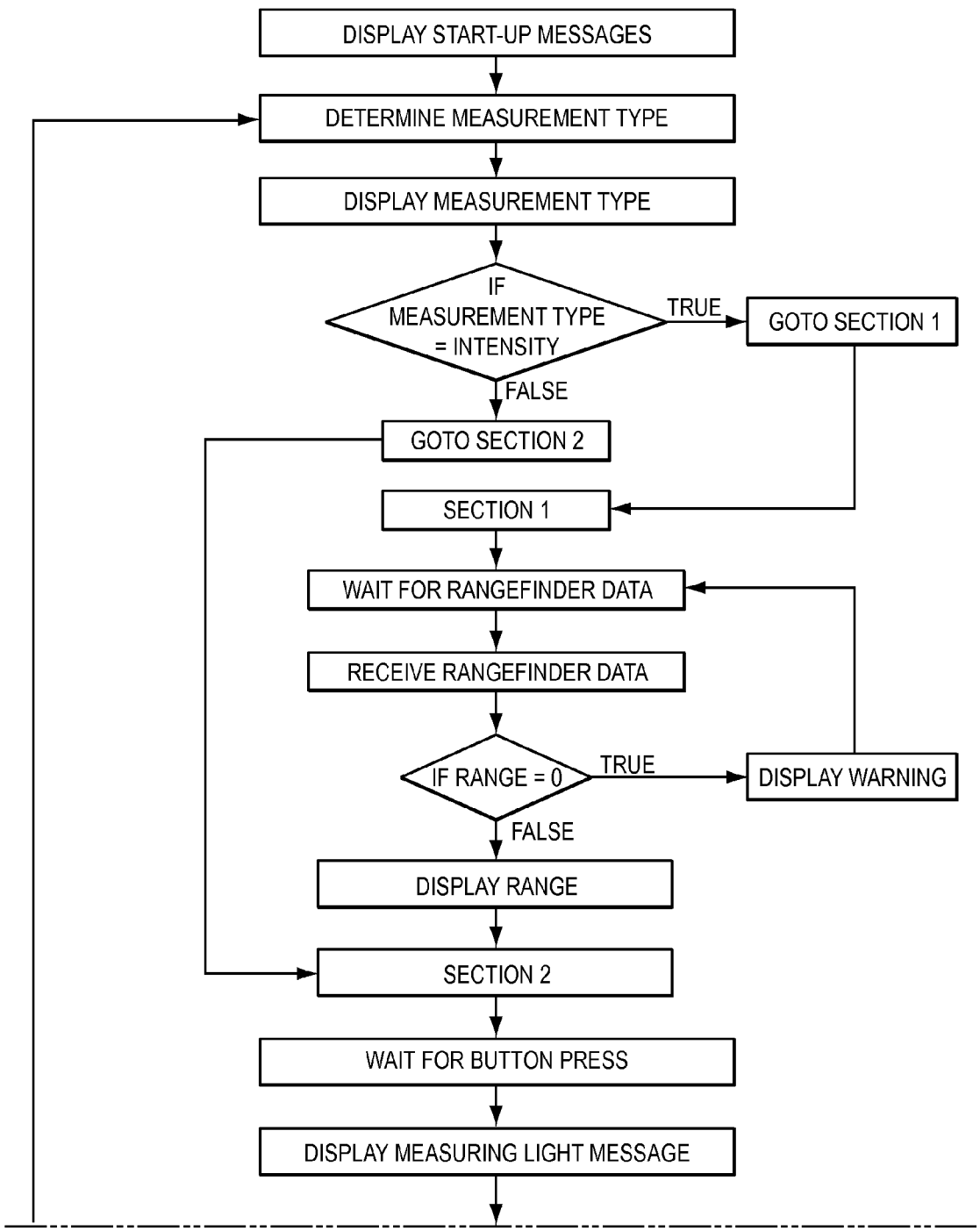
FIGS. 6A-6D is a process flow chart showing the software process used in light measurement calculations associated with the light meter.
Figure 6B:
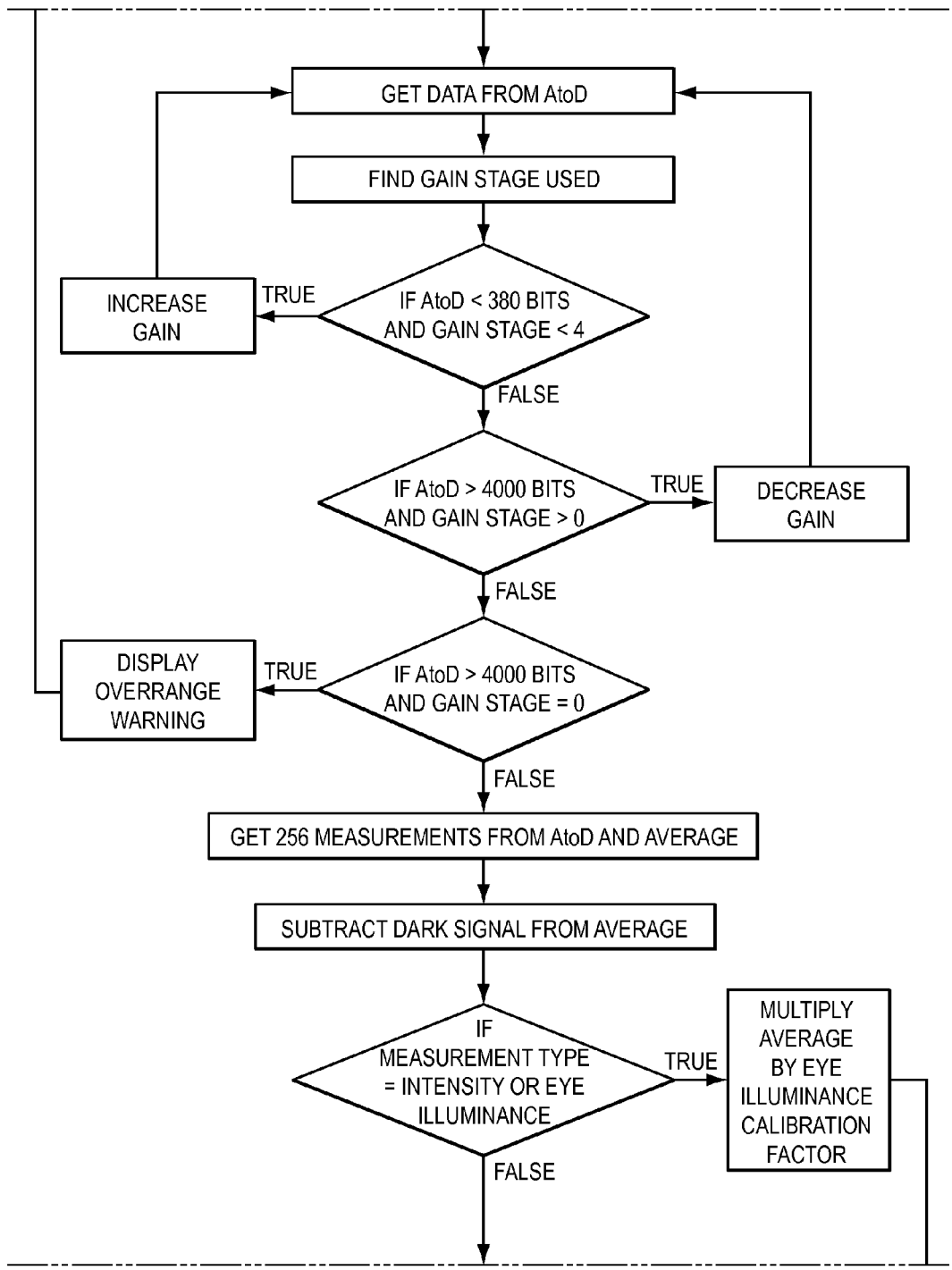
Figure 6C:
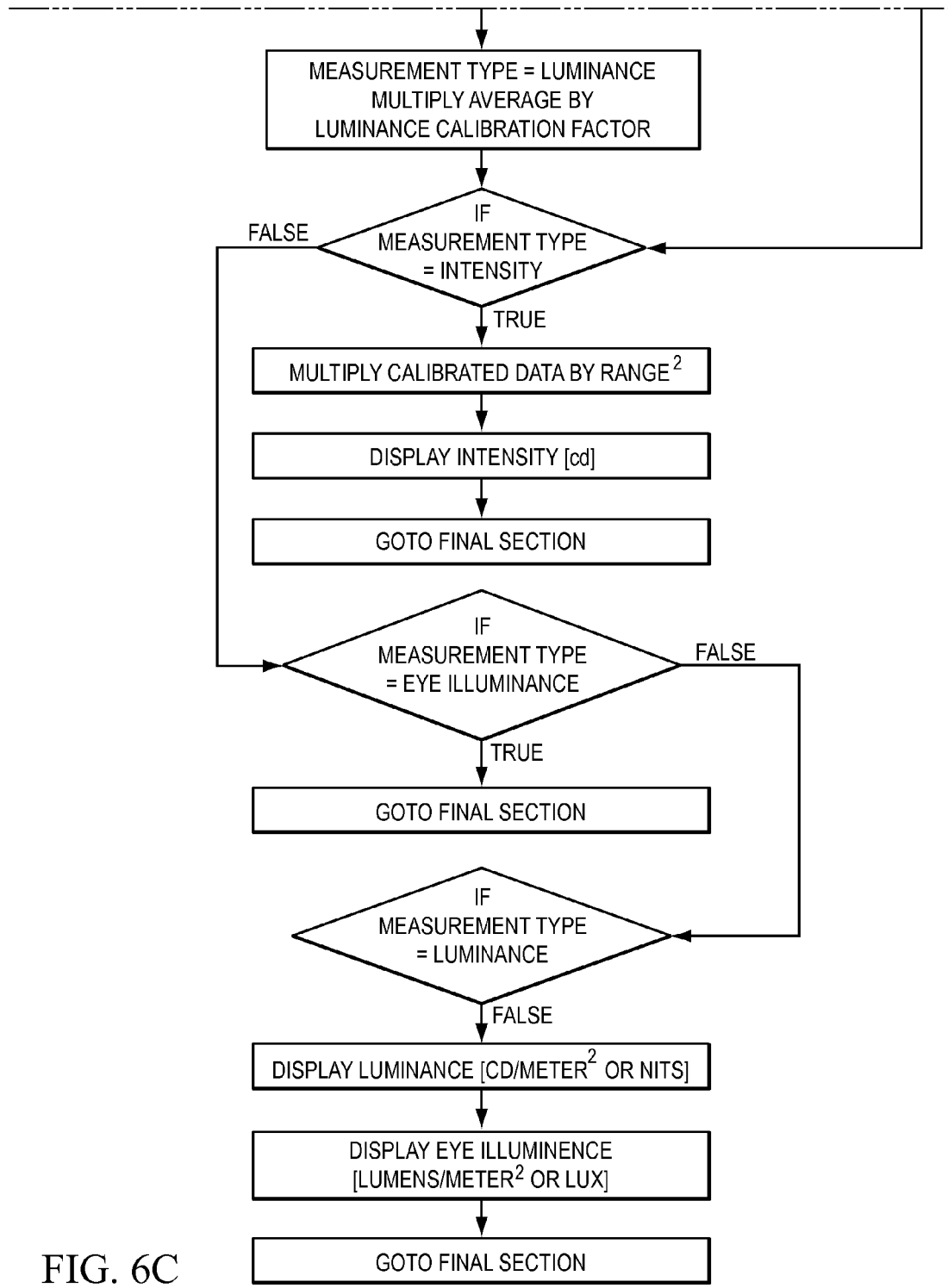
Figure 6D:
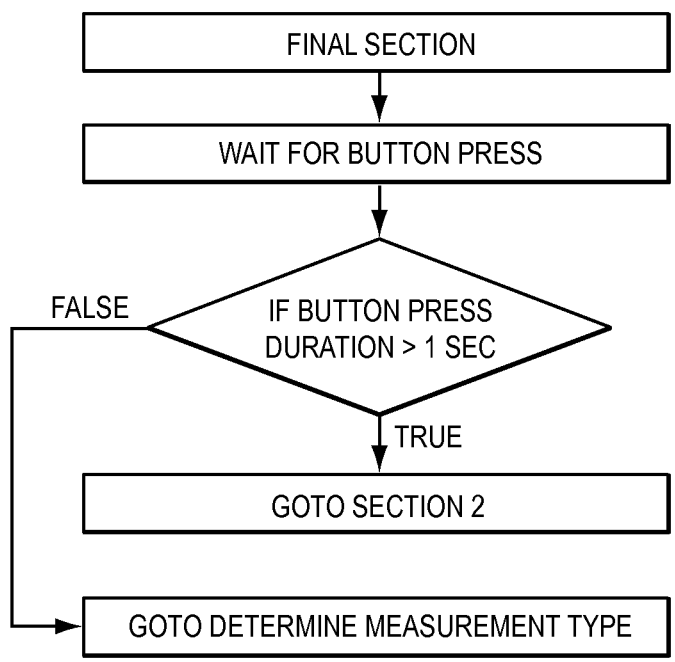

A block diagram of the logic of the device shown in FIGS. 1-4 is shown in FIG. 5. In this figure the processor, such as microprocessor 50, of the electronics, constituting a control unit carried on a printed circuit board 52 has, as one of its inputs, the signal from the photo detector 48. This signal from the photo detector 48, communicated through cable or conduit 56, may be processed through an amplifier 58, in one embodiment an op-amp, controlled by a gain selector switch 60, to operate in a range determined by the operator. In one embodiment of the light meter the amplifier circuit, carried on the printed circuit board 52 for instance, is provided to change light measurement ranges to accommodate sources of light of greatly varying output and at varying distances. This can be achieved, for example, by selecting different feedback resistors for the amplifier circuit in the control unit to which the photo detector is connected so as to alter amplifier gain.

The amplified signal is processed in the A/D converter 62, also normally carried on the printed circuit board 52, to convert the amplified analog signal from the photo detector to a digital signal. The amplified signal, which is proportional to light sensed at the photo detector 48, from the A/D converter 62 is then processed by the microprocessor 50.

In situations where distance to a target source of light is needed to measure light intensity in the field, that being the utility of one of the embodiments described herein, the distance measuring device capability will be implemented. The distance measurement sensed by the distance measuring device subassembly of the light measuring meter is processed onboard the light measuring meter using the distance measuring device logic circuit processor, which can be carried on the printed circuit board 52, and than the output signal representing the distance to the distant object, such as a source of light fixture, is sent through communication conduit 64, after being processed by the microprocessor 50, to the internal display 54 and, in one embodiment, to the external screen 24. This signal represents distance to the target source of light.

Suitable software or firmware programmed into the microprocessor 50 integrates the two readings, that is, the light intensity reading from the telephotometer which was stored in the microprocessor, and the distance reading from the distance measuring device, also stored in the microprocessor and processes this data using the inverse square law algorithm applicable to light intensity measurement to provide the intensity of the source of light of interest in candelas. The inverse square law as applied in the context of measuring light intensity is: Intensity equals illuminance times the distance squared. Intensity is expressed in candelas. Illuminance is expressed in lux and distance is expressed in meters in most situations.

The system includes the capability to place the acquired distance measurement in memory of the microprocessor such that, if so desired, the distance value can be applied, or used in a calculation for subsequent light readings for the computation of intensity of additional sources of light that are at the same or similar distance without having to re-measure the distance to each one of these subsequently selected sources of light.

FIGS. 6A-6D illustrate a process flow chart showing the software process used in the light meter processor scheme. This process flow chart starts with power on of the unit to display startup messages either on the internal LED display 54 and/or on the external screen 24. Toggling through selection options using the second control button 20 will allow operator selection of the desired mode of light measurement.

Continuing on in the chart, acts pertaining to the distance measuring device operation through "Display Range" which may also include transmitting or sending the range data to the processor where it will be stored, are set forth on the chart.

The next stage represented on the chart is the process acts of measuring light at the measuring location coming from the source of light. Pressing control button 20 triggers initiation of this measurement. Part of this cycle is determining the correct range for properly collecting data and notifying the operator of a high or low light condition so that the gain can be adjusted by the operator or, in an alternative embodiment, can be automatically adjusted by the logic programmed into the system. Once the gain is in an appropriate range, the measurement of the light intensity is made. The measurement will be further processed to average a number of readings, subtract the dark signal from the average and adjust the average by a calibration factor. This value will be stored in the microprocessor. The microprocessor will perform the inverse square algorithm on the source of light intensity data and the stored distance data sensed by the distance measuring device portion of the device to arrive at the value in candelas of the light intensity of the source of light being measured.

The embodiment described above is generally directed toward a light-measuring meter that is used to measure light intensity of a source of light from a distance.

In another embodiment where the selector switch is set to eye illuminance, or luminance, these photometric quantities can be measured using the acts set forth in the chart of FIGS. 6A-D.

In an embodiment with a manual gain selector capability the gain selector is provided to change light measurement ranges to accommodate sources of light of greatly varying output and at varying distances. This can be achieved, for example, by selecting different feedback resistors for the amplifier circuit in the control unit resident on the printed circuit board 52 of the photo detector so as to alter amplifier gain as is well known in the art.

The arrangement for measuring the average luminance of a selected area of a luminaire may also be used to measure the luminance of a reflecting surface. All that is needed is for the metering system to be equipped with sufficient sensitivity to make possible the measurement of luminance of low levels, as are typical of many reflecting surfaces.

Returning to FIG. 1, control switches operated through buttons, such as 18 and 20, or input or output elements, such as, but not limited to, a computer connection port such as a USB port, a screen or a radio communication port, to name just two of several ports or switches that may also be incorporated onto the body of the light meter.

In summary, the method of determining the light intensity at a point distant from a source of light in a fixture includes the acts of providing an enhanced telephotometer. The telephotometer will have a lens system including an objective lens mounted at one end of a longitudinal body. The telephotometer will also include a photo detector having a data output communication conduit, the photo detector being mounted to the telephotometer to receive light energy entering the telephotometer. The telephotometer further has a light metering valve, such as but not limited to an iris valve, located in the body of the telephotometer between the location of the objective lens and the location of the photo detector. This location is generally at the focal plane of the objective lens. A controller, typically incorporated into the electronics carried on the printed circuit board 52 is also provided in the light-measuring meter. The controller includes a digital processor 50 and an internal display screen 54 and, in one embodiment, an external screen 24, and is in communication with the photo detector through the communications conduit. A third element of the light meter is the distance measuring device section of the device. The distance measuring device section has electronic communication capability in communication with the controller. The distance-measuring device's return pulsed light signal shares the light path of the light measurement section of the device. In determining light intensity the operator of the enhanced telephotometer will direct the telephotometer at the targeted source of light supported in a light fixture. Once "on target" the enhanced telephotometer will compute the distance to the source of light as sensed by the distance-measuring device. Next the level of light from the source of light as received at the photo detector will be processed by the microprocessor. This data point will be stored in the microprocessor. The computed distance to the source of light fixture, computed using data from the distance measuring device with the distance value stored in the memory section of microprocessor, and the level of light received at the photo detector and now stored in the memory section of the microprocessor will be processed to generate a value of light intensity. The computed value of light intensity at the point where the measurement is taken and distant from the source of light will then be displayed through display screen 54 or on screen 24, of the telephotometer.

While the invention is described herein in terms of preferred embodiments and generally associated methods, the inventors contemplates that alterations and permutations of the preferred embodiments and methods will become apparent to those skilled in the art upon a reading of the specification and a study of the drawings.

Accordingly, neither the above description of preferred exemplary embodiments nor the abstract defines or constrains the invention. Rather, the claims variously define the invention. Each variation of the invention is limited only by the recited limitations of its respective claim, and equivalents thereof, without limitation by other terms not present in the claim.

What is claimed is:

1. Light measuring apparatus including an enclosure housing supporting a light energy detector, a controller and a distance measuring device for measuring luminous intensity, as measured in candelas, of a source of light of a distant target comprising:

the enclosure housing, having a first end, a lens system including an objective lens and a light energy detector aligned on a single light path extending from the objective lens, the light energy detector having an electronic communication conduit and the light energy detector mounted to receive light energy directed along the single light path from the objective lens;

an infrared detector carried in the enclosure, a pick off filter located in the enclosure, the pick off filter located such that infrared component of an incoming light beam entering the apparatus through the objective lens is directed to the infrared detector;

a light metering valve located in the enclosure proximate the focal surface location of the objective lens to selectively control light directed along the single light path extending from the objective lens of the enclosure;

the controller including a digital processor in communication with the light energy detector through the electronic communication conduit;

the distance measuring device having electronic communication capability in communication with the controller, the distance measuring apparatus having a receiving energy pulse path located on the single light path extending from the objective lens of the light measuring apparatus;

the distance measuring device comprising a laser diode for projecting a series of pulsed light signals from the first end of the enclosure to the distant target;

a lens at the first end of the enclosure in front of the laser diode and adjacent the objective lens through which the series of pulsed light signal are projected;

the infrared detector receiving reflected pulses of light reflected from the distant target;

an algorithm for comparing the travel time of pulses sent from the light meter to travel time distances over a measured period of time to determine the distance to the target object;

whereby luminous intensity of a distant source of light, measured in candelas, is determined by using the digital processor of the controller to calculate luminous intensity from illuminance and distance measurements.

2. The invention in accordance with claim 1 wherein the metering valve is an iris diaphragm located at the focal plane of the objective lens.

3. The invention in accordance with claim 1 wherein the light energy detector is a photo detector.

4. The invention in accordance with claim 3 wherein the controller comprises a switch for selectively activating the distance measuring device of the light measuring apparatus.

5. The invention in accordance with claim 1 wherein the light energy detector is a photodiode.

6. The invention in accordance with claim 1 wherein the digital processor receives data from the light energy detector and from the distance measuring device and outputs data to a display in communication with the digital processor.

7. The invention in accordance with claim 1 further comprises a screen and light intensity measured by the light-measuring device is displayed on the screen.

8. The invention in accordance with claim 1 wherein the light meter controller is provided with circuitry to switch the light meter from a setting for measuring light intensity or to a setting for measuring total illuminance, or eye illuminance, or a setting for measuring luminance.

* * * * *